(12) United States Patent
Below

(10) Patent No.: US 7,213,234 B1
(45) Date of Patent: May 1, 2007

(54) SYSTEM AND METHOD FOR FUNCTION POINT SAMPLING FOR SOFTWARE SIZE ESTIMATES

(75) Inventor: Paul A. Below, Poulsbo, WA (US)

(73) Assignee: Electronic Data Systems Corporation, Plano, TX (US)

( * ) Notice: Subject to any disclaimer, the term of this patent is extended or adjusted under 35 U.S.C. 154(b) by 698 days.

(21) Appl. No.: 10/409,646

(22) Filed: Apr. 8, 2003

(51) Int. Cl.
G06F 9/45 (2006.01)
G06F 11/30 (2006.01)
G06F 15/00 (2006.01)

(52) U.S. Cl. .............. 717/127; 717/138; 717/142; 707/182; 707/186

(58) Field of Classification Search ........ 717/124–144; 703/22
See application file for complete search history.

(56) References Cited

U.S. PATENT DOCUMENTS

| | | | | |
|---|---|---|---|---|
| 5,640,335 A | * | 6/1997 | Molvig et al. | 703/9 |
| 5,742,262 A | * | 4/1998 | Tabata et al. | 345/8 |
| 5,963,731 A | * | 10/1999 | Sagawa et al. | 703/6 |
| 6,073,107 A | | 6/2000 | Minkiewicz et al. | |
| 6,658,643 B1 | | 12/2003 | Bera | |
| 6,658,648 B1 | * | 12/2003 | Douceur et al. | 717/120 |
| 6,658,651 B2 | | 12/2003 | O'Brien et al. | |

* cited by examiner

*Primary Examiner*—Tuan Dam
*Assistant Examiner*—Chuck Kendall
(74) *Attorney, Agent, or Firm*—Munck Butrus, P.C.

(57) ABSTRACT

A system, method, and computer program product for estimating the function point count of a software application or portfolio. Strata are defined, and random samples are chosen for a function point count. Results are analyzed and quantified, and a confidence interval is determined to qualify the accuracy of the estimate.

18 Claims, 2 Drawing Sheets

SYSTEM AND METHOD FOR FUNCTION POINT SAMPLING FOR SOFTWARE SIZE ESTIMATES

TECHNICAL FIELD OF THE INVENTION

The present invention is directed, in general, to systems and methods for estimating software and application functional sizes.

BACKGROUND OF THE INVENTION

Stratified random sampling is well based theoretically in the Central Limit Theorem and has been used extensively in many different environments including scientific research, pharmacology studies, government, census and marketing research, and, most closely related to the software industry, as the technique of choice for data processing audits.

Often the problems faced by large IS/IT organizations in establishing the function point baseline for all systems belonging to their corporation appear so formidable that this task is simply avoided. The investment required seems overwhelming to the business managers who are sometimes unaware that the information from such portfolio evaluations is critical to their analytical decision process. Under current venue, one of two options are available for accomplishing the full portfolio count. These are: (1) function point count all systems in the entire portfolio or (2) count all lines of source code according to IEEE standard p1045 and "backfire". There are numerous factors to consider in either option and for most large organizations (perhaps Fortune 100 and larger corporations and government) the bottom line for the first is "too labor intensive" and/or "too costly" (the former if sized in-house and the latter if sizing is outsourced) and for the second is "too inaccurate to be useful". End of story for process improvement and accurate, reliable operations analysis reporting.

A second problem occurs for organizations that need to develop estimates early in a project life cycle, typically a count or function point estimate provides the functional size measure to feed the estimating process. The time frame needed is short, decisions need to be made quickly regarding alternatives and scheduling. For large projects, FP counting an entire system can take days, weeks, or in extreme cases, months. The organization often falls back upon expert opinion based estimates, with no way to check the reasonability of the result. Non-optimum plans are made, with disastrous results in some instances.

Of all the metrics needed for fair analysis of software engineering processes and related productivity and quality evaluations, size is one of the most essential. Without accurate sizing of systems engineering output, any business analysis (which often uses surrogates for size that could be inappropriate) can have the potential for misleading and even damaging results.

The requirement to include operations measures for successful IS/IT business contribution analysis has been well documented.

There is, therefore, a current unmet need today in almost all large IS/IT organizations when operational measurement and especially measures of product function size are unavailable or invalid.

There is, therefore, a need in the art for a system and method for estimating software function sizes.

SUMMARY OF THE INVENTION

To address the above-discussed deficiencies of the prior art, it is a primary object of the present invention to provide an improved system and method for estimating software function size.

The preferred embodiment provides a system, method, and computer program product for estimating the function point count of a software application or portfolio. Strata are defined, and random samples are chosen for a function point count. Results are analyzed and quantified, and a confidence interval is determined to qualify the accuracy of the estimate.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
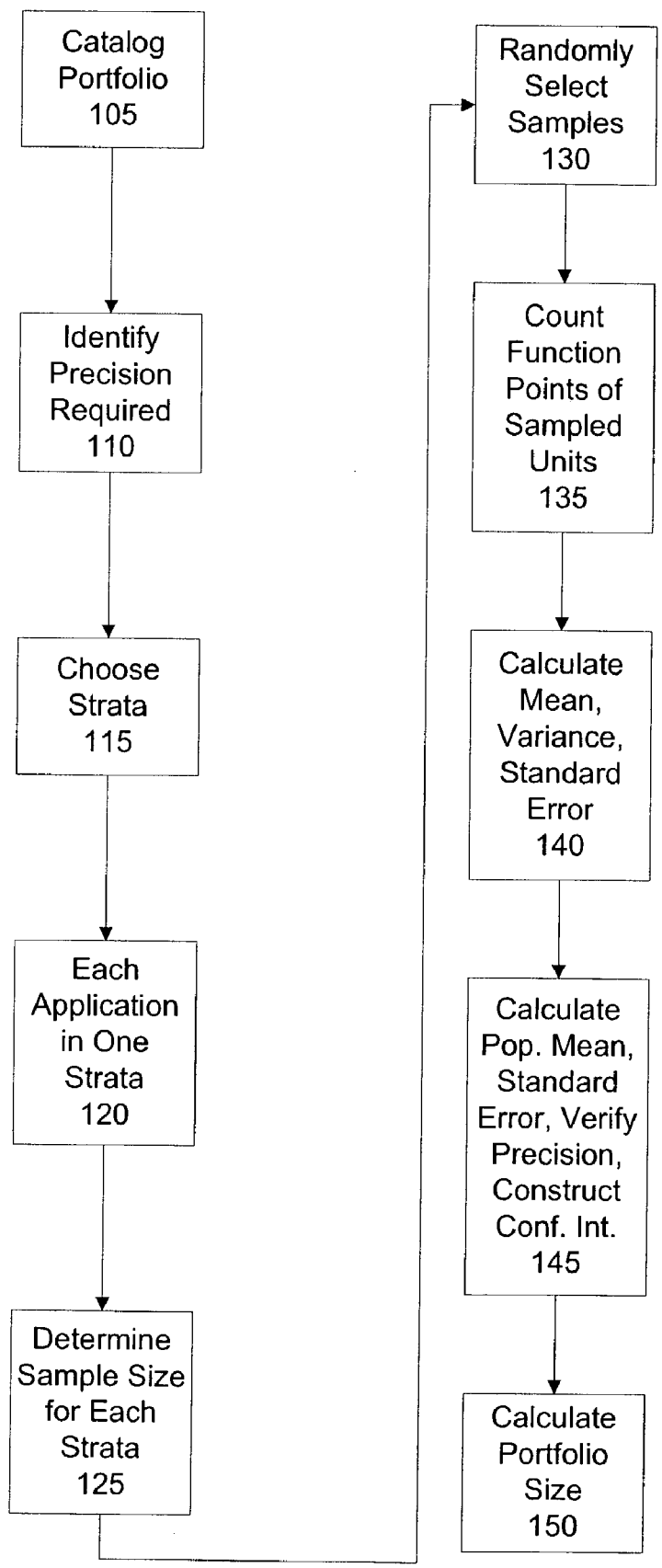
FIG. 1 depicts a flowchart of a process in accordance with a preferred embodiment.
Figure 2:
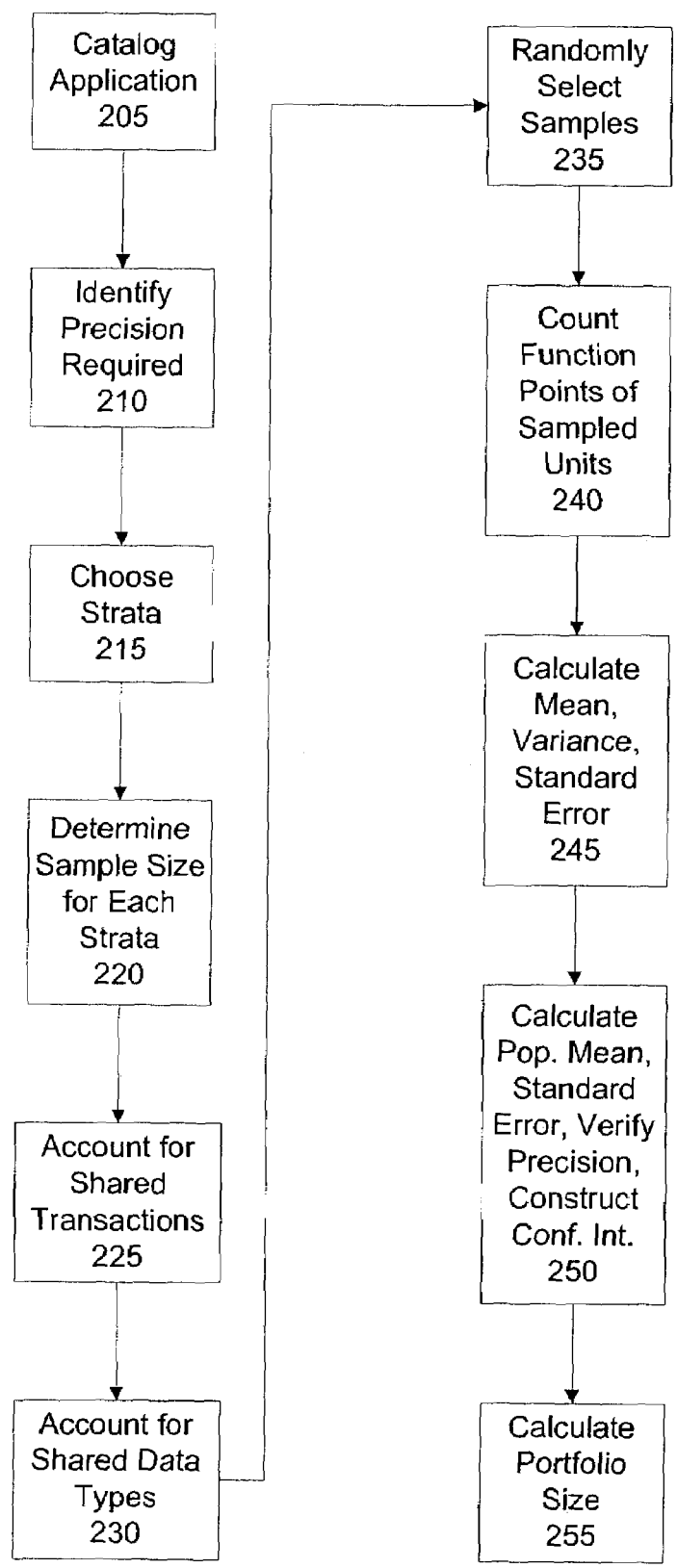
FIG. 2 depicts a flowchart of a process in accordance with a preferred embodiment.

FIGS. 1 and 2, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

The preferred embodiment provides a system, method, and computer program product for estimating the function point count of a software application or portfolio. Strata are defined, and random samples are chosen for a function point count. Results are analyzed and quantified, and a confidence interval is determined to qualify the accuracy of the estimate.

The preferred embodiment provides a sampling system and method for estimating a portfolio size, or an application size, without the expense or time required to conduct a complete count (census). This technique can be used to estimate size for a large portfolio as well as on large applications.

Those of skill in the art of software metrics and function point counts will recognize the various acronyms and terms of art found herein. Typical usages of some terms are listed below; those of skill in the art will recognize when a specific usage differs from the typical meaning:

ILF Internal Logical File
EIF External Interface File
SLOC Source Lines of Code
EQ External inquiry
EO External Output
UFP Unadjusted Function Point Count Experienced function point counters have techniques that they use to produce quick ("ballpark") size estimates. One traditional technique is to count the number of internal data types (ILF) and then multiply by a factor to obtain an estimated size. The limitations of this procedure are:

the result can easily vary from the actual size by 50% or more (the expected variation can be reduced if the application domain is well understood and existing detailed counts from similar applications are used to calibrate the factor.)

No confidence interval can be calculated, so there is no statistical indication of variation of result.

All of the ILF's have to be identified and counted for the entire portfolio or application.

The sampling process of the preferred embodiment solves all of the above limitations.

For sampling to size a portfolio, the major challenges are
to design adequate stratification
to select appropriate sample sizes
to compute the overall confidence intervals For sampling to size an application, the major challenges are
all of the above, plus
to account for the shared data types and the shared transaction types.

A random sample is one in which every item in the population of interest (or the sampling frame) has a known, equal chance of being chosen for inclusion in the sample. This ensures that the samples are chosen without bias and allows for computation of statistical confidence levels.

In stratified sampling, the units in the sampling frame are classified into separate subgroups, or strata, on the basis of one or more important characteristics. Determining which characteristics, if any, are important is somewhat of an art. The goal is to identify characteristics that have a major impact on the measurement being made. Knowledge gained from previous or similar analysis can be used, as well as surveys of experts, and evidence gathered by measurement.

A random sample is taken from each of the strata. This ensures proportionate representation from each of the subgroups in the sample. For example, a sample of the US population conducted by county might categorize the counties as either urban or rural, to ensure representative sampling.

One technique used is to group the applications into small, medium, and large size range using lines of code or pages of documentation or expert opinion.

Typically, the required sample size to reach a certain level of precision is less with a stratified sample than with a simple random sample, which reduces the sampling cost.

Sample Size Determination

A sample mean (average) is an estimate of the population mean. However, the estimate has uncertainty and the population mean almost certainly is different than any sample mean.

A confidence interval for the mean is an estimate interval constructed with respect to the sample mean, with a specified likelihood that the interval includes the value of the population mean. The most frequently used confidence intervals are 90, 95 and 99 percent intervals. For situations where additional risk is an acceptable tradeoff, we use an 80 percent confidence interval.

In general, larger samples result in smaller confidence intervals for a given probability level. The challenge is to select the smallest sample (least cost) that will result in an acceptable confidence interval.

The following formula to use for situations where population has a normal distribution, and the population standard deviation is known (or where the population has a normal distribution and the sample size is $>=30$):

$$n = \left(\frac{z * \sigma}{E}\right)^2$$

where n is the sample size, z is the value used for the specified level of confidence, $\sigma$ is the standard deviation of the population, E is the plus and minus sampling error allowed in the interval (one-half of the total confidence interval).

For other situations, the t distribution is used instead of z, and the sample standard deviation as an estimate of the population standard deviation:

$$n = \left(\frac{t * s}{E}\right)^2$$

Summary table for interval estimation of the population mean:

| Population | Sample Size | σ known | σ unknown |
|---|---|---|---|
| Normally distributed | n >= 30 | ± zσ/√n | ± ts/√n or ± zs/√n |
| | n < 30 | ± zσ/√n | ± ts/√n |
| Not normally distributed | n >= 30 | ± zσ/√n | ± ts/√n or ± zs/√n |
| | n < 30 | +/− tσ/√n | ± ts/√n | where s is the standard deviation of the sample.

Steps for Application Sizing—Sampling
Stratified random sample of:
objects
use cases
events
modules
programs, etc.

Stratify on size range (e.g., pages) or stratify on complexity judged by designers or stratify on other criteria judged to be important factor influencing size. If the artifacts contain a measurable attribute (e.g., number of pages) then create a histogram or stem-and-leaf chart and examine the distribution. Look for gaps in the distribution, as those are logical places to set the boundaries of the strata.

Another possibility is to use cluster sampling. Cluster sampling is a type of random sampling in which the population items occur naturally in subgroups. Entire subgroups are randomly sampled.

To determine the required sample size, use the desired confidence level and an estimated strata standard deviation. The standard deviation can be estimated from previous work (for example, from examination of similar applications that have already been fully counted).

Identify and Account for Shared Transactions

For EQ (External in Quiry) and EO (External Output), during the count of a sampled item, identify those transactions that are likely to be duplicated and compute a percentage. Then, estimate the number of times that transaction is likely to be duplicated by estimating the number of similar business type transactions in the application boundary.

EO and EQ that are thought to be duplicates would not be included in the size of the sample unit. The total size of these items can be added to the stratum total size.

Identify and Account for Shared Data Types

For ILF (Internal Logical File) and EIF (External Interface File), one option is to use industry averages for percent data types. This could be improved with calibration by average for application type.

A better method is to count ILF's from a data diagram for the entire application. Then, do not include the data type sizes in the counts of the sample units, but add the ILF size on at the end. Likewise, EIF's can be counted from a context (spider) diagram or list of interfaces.

If the data diagram is extremely large, it can be sampled to estimate the total number and complexity of ILF's. The variance would be computed and the size of all the data types can then be added to the grand total application size as a final step. The variance would be used toward the pooled variance so that the uncertainty of the data type size would be included in the total uncertainty for the application size.

In sum, the recommended approach would be to treat the data types as a separate stratum.

Calculate Sample Means

Total the function points for the samples from each strata, divide by the sample size to obtain the average size per sample unit for the strata. Multiply by the total strata population to obtain the estimate of the total strata size.

Overall estimated size is the totals of the estimated size for each strata.

Calculate Confidence Intervals

Compute the sample variance for each strata. Compute a sample variance, which is the sample variance divided by the sample size. Compute a pooled variance for all the strata. The sample standard deviation is the square root of the sample variance, and the pooled standard deviation is the square root of the pooled variance.

Compute the confidence intervals, which can be expressed for each strata as well as for the pooled sample. The formula is:

$$\bar{x} \pm t \frac{s}{\sqrt{n}}$$

where
$\bar{x}$ is the sample mean
t is Student's t for the degrees of freedom and the desired confidence level
s is the sample standard deviation
n is the sample size
The strata variance for strata 1 is $$V_1 = \sum \frac{(x^2 - n_1 \bar{x}_1^2)}{(-n_1 - 1)}$$

and the pooled variance for all strata is $$V = \sum \left(\frac{V}{n}\right)$$

If the resulting confidence interval is too wide (for either one or more individual stratum, or for the pooled application), then either:
determine the sample size needed to obtain the desired width, and resample, or
modify the confidence level and accept the additional risk that the actual result would fall outside the confidence interval To determine the necessary sample size, use the appropriate formula from the Sample Size Determination section of this paper.

Output of Application Sizing includes:
Create the grand total, add the estimates of each of the strata plus any special items (such as the data types)
Pool the variances to compute the overall confidence interval.

Steps for Portfolio Sizing—Method

FIG. 1 shows a flowchart of a portfolio sizing method in accordance with a preferred embodiment of the present invention.

(1) The portfolio must have all applications catalogued including the name, system ID, location, technology, language, size in SLOC if available and the supporting organization (step 105).

(2) The identification of the level of precision and confidence required in deriving the overall sample mean must be accomplished through discussion with management (step 110). The precision is usually a function of the various uses planned for the portfolio size data. In any case, it is suggested that a precision of no less than +/−10% be established. (This is as good or better than the inter-counter reliability level established by empirical study when several individuals of equivalent and appropriate qualifications count the same system).

The sample size will be driven by the precision and the level of confidence required by management. It will be calculated using the results of step (2) conclusions. Variation is estimated by the stratification variable such as SLOC which is highly correlated with the Function Point value.

(3) In conjunction with the systems experts within the local organization, the stratification variable will be chosen (step 115). This variable should be highly suspected of having a direct relationship to application size. It could be a categorical variable such as platform or language or it could be a numeric variable such as SLOC if this information is available for each application.

The goal is to have the contents of each stratum as homogeneous as possible with respect to the expected function point count and to have each stratum as different (heterogeneous) as possible with respect to the expected function point count. The Neyman allocation method suggested here considers both size and variability as important elements of stratum selection. Ultimately, this means that the degree of variation of function point size within a stratum will be more important in drawing stratum boundaries than the establishment of an arbitrary equivalence of each stratum size. Since the stratum size is allowed to vary, this is called disproportionate stratified random sampling. The size of the sample relative to the size of the total population of applications will be used as a weighting factor in the final calculations.

(4) Be sure each application in the catalog described in step (1) is contained in the appropriate stratum which was established in step (3) (step 120). Assignment is mutually exclusive and collection exhaustive.

(5) Allocate the total sample size derived in step (3) to the various strata, using a larger sample in those stratum that had the highest level of variation in the surrogate, SLOC, and a smaller sample in those with very little variation (step 125).

(6) A sequential number must then be assigned to each application in each stratum. Following this assignment a random (or pseudorandom) sample must be drawn from each stratum using either a table of random numbers or a random sample generator available on most analytical software packages (step 130).

Match the sequence of random numbers to the numbers assigned in each stratum. Continue until the required sample size has been achieved in each stratum.

(7) Fully count the function points of each sample application (step 135).

(8) Calculate the function point mean, variance and standard error of the estimate for the samples in each stratum and the weight for stratum size (step 140).

(9) Calculate mean and the standard error of the estimate of population mean (population equals the entire portfolio). Use the standard error of the estimate to prove that the mean estimate carries the required precision. Construct the confidence interval about the mean. (step 145)

(10) Calculate the total expected portfolio size based on the estimate of the population mean and the total number of applications in the portfolio (step 150).

Steps for Application Sizing—Method

FIG. 2 depicts a flowchart of an application sizing process in accordance with a preferred embodiment. Further details of each step are described elsewhere herein.

1. Catalog application, identify objects (Use Cases, Events, etc.) to be sized (step 205).
2. Identify precision required (step 210).
3. Choose strata (step 215).
4. Determine sample size for each strata (step 220).
5. Identify and account for shared transactions: determine which technique will be used (step 225).
6. Identify and account for shared data types: determine which technique will be used (step 230).
7. Randomly select samples (step 235).
8. Fully count the sampled units (step 240).
9. Calculate sample & population means, variance, and standard error for each stratum (step 245)
10. Calculate population mean and standard error and variance; prove that the mean estimate carries the required precision, construct the confidence interval about the mean. (step 250)
12. Determine total function point count (step 255).

Finer Granularity

As a practical matter, to obtain management reporting goals, it may be necessary to estimate the size of individual applications within each stratum. In this case, the standard error of the estimate could be evaluated for each stratum mean and a prediction of application size for each application in a given stratum calculated by multiplying the stratum mean by the number of elements in the stratum.

Output of portfolio sizing includes, in the preferred embodiment:

Supporting calculations
Stratum mean
Stratum variance
Stratum standard error of the estimate
Weight for each stratum
Variance of the overall estimate
Standard error of the overall estimate
Precision
Confidence Interval
Predicted value in FP for each stratum

EXAMPLES

This section contains example outputs of the process.

Application Example: The first example is a size estimate for a large application. The application artifacts consisted of documented use cases.

Introduction: The Use Cases were grouped into 4 strata based on subjective estimates of complexity and size.

Population Size (use case counts by strata):
128 Simple
19 Medium
14 Complex
1 Special
Total: 162 use cases.

Special: The Special Use Case was counted at 226 UFP. There were no ILF's in the use case. No further calculations are needed for this strata.

Complex: The 14 Complex Use Cases had a random sample of 5 selected and counted. The total sizes were 75, 220, 50, 119, 27. Not including the ILFs, the size of the 5 sampled cases is: 61, 143, 50, 105, 27.

The sample mean is (61+143+50+105+27)/5=77
The sample variance, s2, is 2156.2
The sample standard deviation, s, is 46.4
The formula for a confidence interval is:

$$\bar{x} \pm t \frac{s}{\sqrt{n}}$$

For a 90% confidence interval, with 4 degrees of freedom, t=1.53

The 90% confidence interval of the strata mean is 77+/−31.7

For a 80% confidence interval, with 4 degrees of freedom, t=0.941

The 80% confidence interval of the strata mean is 77+/−19.5

Not including the ILFs:

The strata of 14 Use Cases has an estimated size and 90% confidence interval of 1078+/−444 UFP The strata of 14 Use Cases has an estimated size and 80% confidence interval of 1078+/−273 UFP Medium: The 19 Medium Use Cases had a random sample of 5 selected and counted. The total sizes were 60, 45, 101, 48, and 39 UFP.

Not including the ILF's, the size of the 5 sampled cases is: 32, 45, 66, 48, and 19 UFPs.

The sample mean is 42.

The sample variance is 312.5

The sample standard deviation is 17.7

For a 90% confidence interval, with 4 degrees of freedom, t=1.53

The 90% confidence interval of the strata mean is 42+/−12.1

For a 80% confidence interval, with 4 degrees of freedom, t=0.941

The 80% confidence interval of the strata mean is 42+/−7.4

Not including the ILFs:

The population of 16 Use Cases has an estimated size and 90% confidence interval of 798+/−230

The strata of 16 Use Cases has an estimated size and 80% confidence interval of 798+/−141 UFP Simple: The 128 Simple Use Cases had a random sample of 10 selected and counted. The total sizes were 24, 7, 18, 12, 13, 16, 17, 14, 11, and 35 UFP.

Not including the ILF's, the size of the 10 sampled cases is identical except for the last, which is 21 UFPs instead of 35.

The sample mean is 15.

The sample variance is 24.9

The sample standard deviation is 5

For a 90% confidence interval, with 9 degrees of freedom, t=1.38

The 90% confidence interval of the strata mean is 15+/−2.2

For a 80% confidence interval, with 9 degrees of freedom, t=0.883

The 80% confidence interval of the strata mean is 15+/−1.4

Not including the ILFs:

The strata of 128 Use Cases has an estimated size and 90% confidence interval of 1920+/−282 UFP The strata of 128 Use Cases has an estimated size and 80% confidence interval of 1920+/−179 UFP System Totals, Not including ILF's:

Complex: 1078 UFP

Medium: 798 UFP

Simple: 1920 UFP

Special: 226 UFP

Total: 4,022 UFP

Confidence intervals:

Pooled variance is (2156.2/5)+(312.5/5)+(24.9/10)=496

Standard Deviation, s, is 22.2

Total sample drawn, n=20

For 19 degrees of freedom, t is 1.33 and 0.861 (90 and 80% respectively)

90% confidence interval is +/−6.6, 80% is +/−4.4.

There are 161 use cases in the population (not including the Special strata)

Grand Total Estimate, not including ILFs:

90% Confidence interval 4,022 UFP+/−1063 UFP

80% Confidence interval 4,022 UFP+/−708FP

Estimating ILFs

There are several possible ways to do this.

We have the UFP from ILFs provided with the sample counts. We could include them and rerun the above calculations. The result would be a high estimate, as some of the ILF's would be shared between use cases.

We could use industry (ISBSG) data, to provide a percent ILF to multiply by the 3541 UFP. For new development, the ISBSG percent is 22.1.

We could use the ILF percent in the sample as a check on the industry data. The 20 sampled use cases (not including the Special one) had a total of 202 ILF UFP, and 745 non-ILF UFP, or 947 total UFP. 202/947=21.3%. This is slightly lower than the industry data, which implies that the overall total for this system will be lower still, as the estimate will include shared ILFs.

However, using the industry 22.1 percent, there would be 4022*0.221=889 ILF UFP in the system. As stated, this should be viewed as a high estimate. Due to the use of the industry data, it is not possible to put a confidence interval on the ILF estimate.

Grand Total 4,022+889=4911 UFP, for the entire system, including ILF's.

Recommend that the estimate be run with a +/− size range of between 700 and 1000 FP.

Portfolio Example

The exemplary Enterprise Model provided the "population" of interest (all outsourced applications) for which the total function point size was required. Because management wished to have applications verified for function point size by this process, a set of these retained systems were included in the verification process. They have been removed from the Outsourced Baseline Report and reported separately.

The stratified random sampling technique was chosen to estimate the total outsourced application function point baseline because it is capable of delivering a given level of precision thereby providing the most accurate estimate of true baseline size within the time frame constraint.

The precision required by management in estimating the baseline size was "less than or equal to +/−10%". This level of precision at the 95% confidence level required a total sample size of at least 320 to be drawn. A total of six strata were drawn using the "disproportionate" approach, meaning that the strata were allowed to have a differing number of elements in order to maintain as great a degree of homogeneity within strata as possible with respect to the stratification variable, Source Lines of Code.

The total sample size represented in this report is 329. Of those, 4 belong to the retained systems portfolio leaving 326 outsourced applications that were allocated amongst the six strata. The total number of applications identified in the Enterprise Model that were deemed suitable for inclusion in the baseline verification project comprise the study population. This report is based on these 1006 study population applications of which 17 are retained systems, leaving 989 outsourced production applications.

Calculations

For each stratum:

Stratum sample mean $$(\overline{Xh}) = \sum \frac{Xi}{nh}$$

Where n is the number of sample applications randomly chosen from stratum h and where each Xi is the actual randomly selected and function-point-counted sample element Stratum variance $$(s^2) = \sum \frac{(Xi - \overline{Xh})}{nh}$$

Where $s^2$ represents the estimated variance.

Standard error of the estimate $$(s_{xh}) = \frac{s}{\sqrt{nh}}$$

Where the subscript xh represents the standard error of the mean estimate of stratum h and n is the number of sample elements in stratum h.

Sample mean for the overall stratified random sample is calculated by weighting each stratum mean by the ratio of the number of elements in the stratum to the total study population. This is represented by:

$$\overline{x}st = \sum \frac{N(stratum\ elements\ in\ h)}{N(total\ population\ study\ elements)} * \overline{x}h$$

where h again represents the stratum.

The combined standard error of the estimate is found by taking the variance of the overall estimate, then taking its square root.

$$s^2 \overline{x}st = \sum \left(\frac{Nh}{N}\right) * s\overline{x}h$$

$$sst = \sqrt{s^2}$$

Portfolio Baseline

The following are the specific calculations for the outsourced applications baseline verification:

Stratum 1 (h=1)
Stratum mean ($\overline{x1}$)=23.221
Stratum variance ($s^2$)=11.66**
Standard error of the estimate $$(sxh) = \frac{11.66}{\sqrt{24}} = 2.381$$

Stratum 2 (h=2)
Stratum mean ($\overline{x2}$ bar) 65.031
Stratum variance ($s^2$)=17.070
Standard error of the estimate $$(sxh) = \frac{17.070}{\sqrt{32}} = 3.018$$

Stratum 3 (h=3)
Stratum mean ($\overline{x3}$)=298.761
Stratum variance ($s^2$)=154.498
Standard error of the estimate $$(sxh) = \frac{154.498}{\sqrt{155}} = 12.410$$

Stratum 4 (h=4)
Stratum mean ($\overline{x4}$)=1067.200
Stratum variance ($s^2$)=457.278**
Standard error of the estimate $$(sxh) = \frac{457.278}{\sqrt{75}} = 52.802$$

Stratum 5 (h=5)
Stratum mean ($\overline{x5}$)=3166.195
Stratum variance ($s^2$)=1477.922
Standard error of the estimate $$(sxh) = \frac{1477.922}{\sqrt{41}} = 230.813$$

Stratum 6 (h=6)
Stratum mean ($\overline{x6}$)=13428.500
Stratum variance ($s^2$)=605.991
Standard error of the estimate $$(sxh) = \frac{605.991}{\sqrt{4}} = 302.995$$

Combined Mean for the Total Stratified Random Sample xst=55/1006(23.221)+131/1006(65.031+472/1006 (298.671) +210/1006(1067.200)+135/1006 (3166.185)+4/1006(13428.500) =851.223=portfolio expected mean Combined Variance of the Estimate Variance($s^2$st)=(55/1006)$^2$(2.381)$^2$+(131/1006)$^2$ (3081)$^2$+(472/1006)$^2$(12.410)$^2$+(210/1006)$^2$ (52.802)$^2$+(135/1006)$^2$(230.813)$^2$+(4/1006)$^2$ (302.995)$^2$=1116.423

Combined Standard Error of the Estimate sst=√1116.423=33.4129

Confidence Interval (95%) on the portfolio mean:

851.223−1.96(33.4129)<m<851.223+1.96(33.4129)

The CI shows that in 95 out of every 100 samples drawn, the mean will lie between 785.734 and 916.712.

Total expected size of the Portfolio:

851.223*1006=856,330 function points

The 95% Confidence Interval on the total portfolio size: 798,448 to 922,312 function points.

(Notice that the expected value of 855,330 and its confidence interval represent a precision BETTER THAN the promised +/−10%)

Subtract 17,576 retained function points.

Net supported Function Points=838,754

Those skilled in the art will recognize that, for simplicity and clarity, the full structure and operation of all data processing systems suitable for use with the present invention is not being depicted or described herein. Instead, only so much of a data processing system as is unique to the present invention or necessary for an understanding of the present invention is depicted and described. The remainder of the construction and operation of a claimed data processing system may conform to any of the various current implementations and practices known in the art, and unless otherwise noted herein, those of skill in the art will recognize that any claimed features of a data processing system can be implemented using conventional data processing system and data processing system network hardware, configured and programmed to operate as claimed and described. In particular, any steps of described processes can be implemented using known data processing system means.

It is important to note that while the present invention has been described or claimed in the context of a fully functional system, those skilled in the art will appreciate that at least portions of the mechanism of the present invention are capable of being distributed in the form of instructions contained within a machine usable medium in any of a variety of forms, and that the present invention applies equally regardless of the particular type of instruction or signal bearing medium utilized to actually carry out the distribution. Examples of machine usable mediums include: nonvolatile, hard-coded type mediums such as read only memories (ROMs) or erasable, electrically programmable read only memories (EEPROMs), user-recordable type mediums such as floppy disks, hard disk drives and compact disk read only memories (CD-ROMs) or digital versatile disks (DVDs), and transmission type mediums such as digital and analog communication links.

Although an exemplary embodiment of the present invention has been described in detail, those skilled in the art will understand that various changes, substitutions, variations, and improvements of the invention disclosed herein may be made without departing from the spirit and scope of the invention in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:

1. A method for estimating the function point count of software, comprising:
   dividing a software package into multiple strata;
   determining a sample size for each strata;
   selecting a plurality of the strata;
   counting the function points of each of the plurality of the strata;
   performing a statistical analysis of the plurality of the strata, the counted function points, and the software package; and
   determining an estimated function point count and associated confidence interval for the software package.

2. The method of claim 1, wherein the software package is a single software application.

3. The method of claim 1, wherein the software package is a software application portfolio.

4. The method of claim 1, further comprising accounting for shared transactions among multiple strata.

5. The method of claim 1, further comprising accounting for shared data types among multiple strata.

6. The method of claim 1, wherein the statistical analysis includes determining at least one function point statistical data selected from the group consisting of mean, variance, standard error of strata, standard error of population, and population mean.

7. The method of claim 1, further comprising cataloging the software package.

8. The method of claim 1, further comprising verifying that the estimated function point count meets a predetermined precision.

9. The method of claim 1, wherein the plurality of strata are selected at random.

10. A computer program product tangibly embodied in a computer-readable medium, comprising:
    instructions for dividing a software package into multiple strata;
    instructions for determining a sample size for each strata;
    instructions for selecting a plurality of the strata;
    instructions for counting the function points of each of the plurality of the strata;
    instructions for performing a statistical analysis of the plurality of the strata, the counted function points, and the software package; and
    instructions for determining an estimated function point count and associated confidence interval for the software package.

11. The computer program product of claim 10, wherein the software package is a single software application.

12. The computer program product of claim 10, wherein the software package is a software application portfolio.

13. The computer program product of claim 10, further comprising instructions for accounting for shared transactions among multiple strata.

14. The computer program product of claim 10, further comprising instructions for accounting for shared data types among multiple strata.

15. The computer program product of claim 10, wherein the statistical analysis includes determining at least one function point statistical data selected from the group consisting of mean, variance, standard error of strata, standard error of population, and population mean.

16. The computer program product of claim 10, further comprising instructions for cataloging the software package.

17. The computer program product of claim 10, further comprising instructions for verifying that the estimated function point count meets a predetermined precision.

18. The computer program product of claim 10, wherein the plurality of strata are selected at random.

* * * * *